United States Patent [19]

Mandrin

[11] Patent Number: 5,407,468
[45] Date of Patent: Apr. 18, 1995

[54] PROCESS AND A PLANT FOR THE DEOXIDATION OF WATER

[75] Inventor: Charles Mandrin, Winterthur, Switzerland

[73] Assignee: Sulzer Chemtech AG, Winterthur, Switzerland

[21] Appl. No.: 118,083

[22] Filed: Sep. 8, 1993

[30] Foreign Application Priority Data

Sep. 23, 1992 [EP] European Pat. Off. ........ 92810725

[51] Int. Cl.⁶ .............................................. B01D 19/00
[52] U.S. Cl. .......................................... 95/170; 95/171
[58] Field of Search ................... 95/159, 170, 171; 431/4, 5, 12, 268; 210/750

[56] References Cited

U.S. PATENT DOCUMENTS

| | | | |
|---|---|---|---|
| 4,530,820 | 7/1985 | Henriksen | 423/219 |
| 4,937,004 | 6/1990 | Mandrin et al. | 210/750 |
| 5,006,133 | 4/1991 | Mandrin et al. | 55/53 |

FOREIGN PATENT DOCUMENTS

| | | |
|---|---|---|
| 0327491 | 8/1989 | European Pat. Off. |
| 0329601 | 8/1989 | European Pat. Off. |
| 0391839 | 10/1991 | European Pat. Off. |
| 2519037 | 10/1976 | Germany |

OTHER PUBLICATIONS

Patent Abstracts of Japan, vol. 6, No. 3 (C-86) Jan. 9, 1992 & JP-A-56 127 680 (Agency of Ind. Science & Technology) Oct. 6, 1981; Abstract.

Patent Abstracts of Japan, vol. 5, No. 183 (M-97), Nov. 21, 1981 & JP-A-56 104 131 (Hitachi) Aug. 19, 1981.

Patent Abstracts of Japan, vol. 16, No. 369 (C-972) Aug. 10, 1992 & JP-A-41 18 090 (Konica) Apr. 20, 1992; Abstract.

*Primary Examiner*—Neil McCarthy
*Attorney, Agent, or Firm*—Townsend and Townsend Khourie and Crew

[57] ABSTRACT

The water is brought into contact with a gas mixture for the removal of its oxygen content. The gas mixture is then circulated in a circulation (6, 7) and at the same time the oxygen is removed from the gas mixture charged therewith in a catalytic device (9) by means of a fuel gas. For this purpose a gas mixture (15) is produced from a fuel gas (12) and an inert gas (13), conveyed to the circulation in an explosion-proof manner and added to the recycling gas by mixing. The fuel gas content and the inert gas content of the gas mixture supplied (15) are adjusted so that the resultant gas mixture (16) in the circulation in front of the catalyst device (9) has firstly an excess factor $E=1$ and so that secondly it lies under the ignition limit (Z). This produces by simple means a cost-effective plant, which can be operated so that it is explosion-proof.

10 Claims, 5 Drawing Sheets

PROCESS AND A PLANT FOR THE DEOXIDATION OF WATER

BACKGROUND OF THE INVENTION

The invention relates to a process and a plant for the deoxidation of water, in particular of sea water, which for the removal of its oxygen content is brought into contact with a gaseous propellant, which propellant is circulated in a circulation and the oxygen being removed from the propellant laden therewith in a device by catalytic combustion by means of a fuel gas. A widespread method for deoxidisation consists in the degasification of the water in a multi-stage vacuum column. However this is very expensive and associated with high energy consumption. In addition further corrosive and expensive chemicals have to be used for the removal of remaining traces of oxygen. In the light of all these problems an attempt was made to deoxidize the water by means of a closed gas circulation, as is described, for example, in EP Application 0327491. Even these processes, in which, for example, natural gas is injected as the fuel gas through a separate line into the catalyst bed, have serious disadvantages and problems. Thus relatively expensive plants with large circulating devices, precise metering devices and monitoring devices are required in order to be able always to maintain the necessary gas compositions in the circulation operation and to exclude operational errors. Furthermore additives and associated metering and monitoring devices, which are also expensive, are required. Most importantly of all there is the risk of explosion in these relatively large plants. In practice it is not possible to exclude a leakage. Therefore the entire plant has to be made explosion-proof and for this purpose, for example, be provided with an additional expensive ventilation device, which consumes energy and requires a lot of space. However often this is not at all possible for reasons of space, e.g. on platforms or on ships and in particular not when retrofitting existing plant. If the necessary pressure in the circulation is maintained by the addition of nitrogen, this in turn requires too great consumption of nitrogen. On the other hand when air is used as the pressure maintaining agent, there is an additional consumption of fuel and unacceptably high $CO_2$ production.

The object of the present invention is therefore to overcome the disadvantages of the known processes and in particular to create an explosion-proof process, which does not require any expensive protective measures. In addition it should be possible to control the plant simply and with a high level of operational safety, to use little fuel and energy and not to give off any pollutants, including $CO_2$, to the atmosphere.

SUMMARY OF THE INVENTION

The invention essentially consists in that in the entire circulation a gas mixture, which can not explode in the event of any egress by leakage into the ambient air, is produced and maintained, in that an explosion-proof supply line for a corresponding gas mixture right up to the circulation is used with simple means and in that this supplied gas mixture is mixed with the recycling gas directly on entering into the circulation, so that at no point in the zone to be protected, in which the plant is located, can an explosive gas mixture be produced. For this purpose, to the supplied gas mixture is firstly added a fuel gas content, e.g. over 10 mol %, which after being mixed into the circulation in the resultant circulation mixing permits a catalytic reduction of the total oxygen. Secondly the inert gas content in the supplied gas mixture is kept at least sufficiently high for the resultant gas mixture in the gas mixture to lie beneath the ignition limit. These marginal conditions for the supplied gas mixture surprisingly produce a relatively wide permissible range, which can be achieved and maintained with a low metering expenditure, with correspondingly simple and robust apparatus and with great operational safety.

BRIEF DESCRIPTION OF THE DRAWINGS

The invention is explained in further detail below in conjunction with the figures and by means of examples.

DESCRIPTION OF THE PREFERRED EMBODIMENTS

Figure 1:
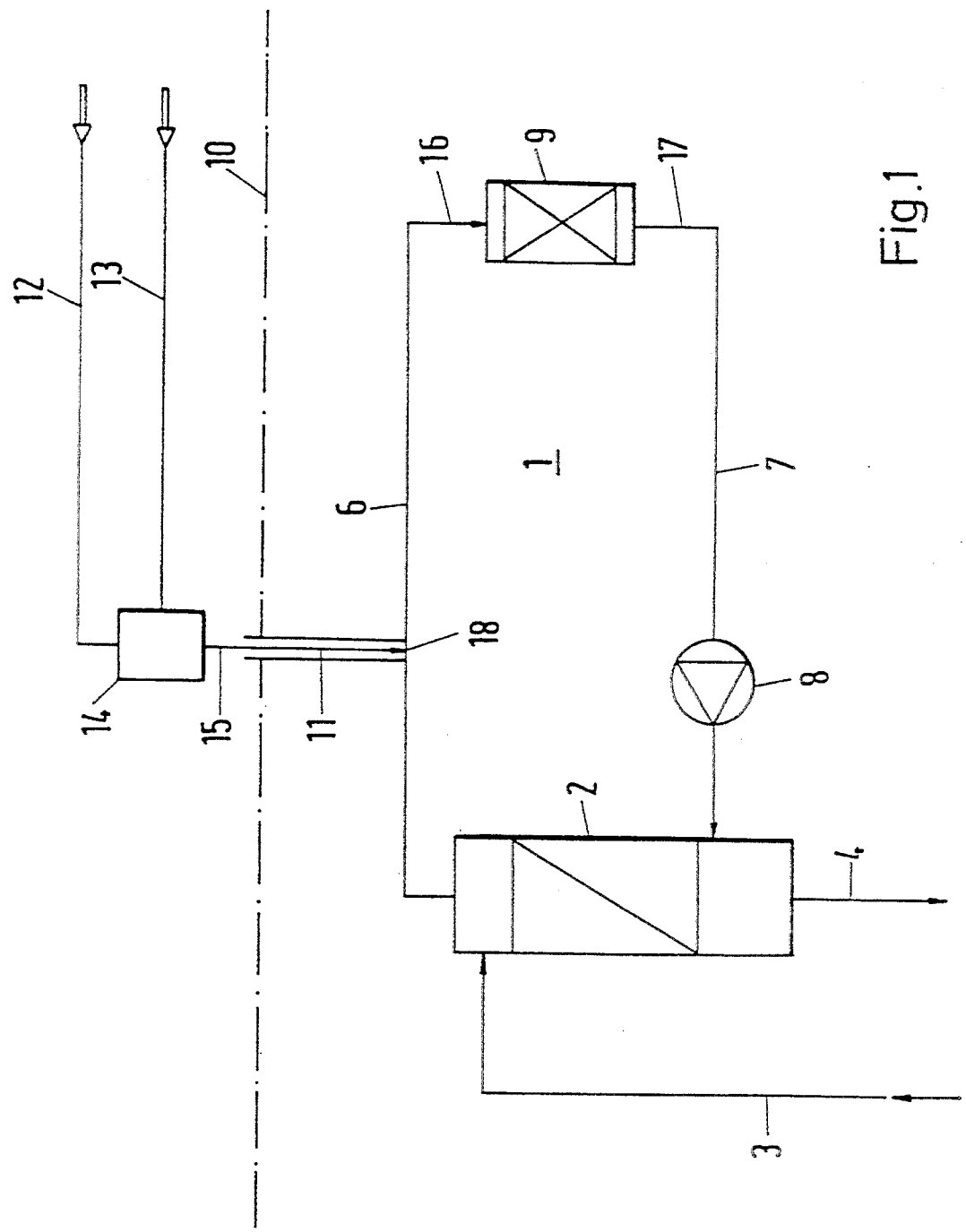
FIG. 1 shows the principle of the process according to the invention with a diagrammatically represented plant.

The plant 1 for the deoxidation of water lies in a zone to be protected with boundary 10 as shown in FIG. 1. It contains a contact device 2 with an inlet 3 for oxygenous water and an outlet 4 for the deoxidized water. A gas circulation passes through the contact device 2 via line 6 into a catalytic combustion device 9 and from here via a return line 7 and driven by means of a conveying medium 8 back into the contact device 2. The gas mixture in the circulation is fed through an explosion-proof supply line 11. A fuel gas is conveyed via a supply line 12 and an inert gas is supplied via a supply line 13 into a metering and mixing device 14 and the gas mixture 15 resulting therefrom is then conveyed via the explosion-proof supply line 11 to the circulation and there added to the recycling gas (18), so that the recycling gas always has a composition at any point which is not ignitable. At the inlet to the catalyst 9 the recycling gas mixture (16) must have an excess factor of at least $E=1$. The excess factor E is here defined as the fuel concentration of the recycling gas (16) divided by the stoichiometric required concentration. On the other hand the fuel content in the recycling gas (16) in front of the catalyst must always be still beneath the ignition limit of the recycling gas mixture.

The adjustment and control of the required fuel gas-/inert gas mixture 15 can be cheaply achieved with simple and reliable apparatus. As shown in the exemplified embodiment in FIG. 2a, the throughput of the fuel gas 12 is controlled by a control valve 32 so that the pressure in the contact device 2 remains constant. Here the control valve 32 is controlled by a pressure control device 31. In operation the pressure of the recycling gas tends to drop, because of the high solubility of fuel gas and resultant $CO_2$ in water and also because the water vapour produced by catalytic combustion condenses and is discharged with the water 4. For metering the inert gas content 13 in the gas mixture 15 simple apparatus can in turn be used. Here the fuel gas and inert gas throughputs are both detected by simple and reliable flowmeters 33 and 34, e.g. in the form of orifices with associated pressure transmitters. These throughputs are compared in a controller 35 and kept in a preselected range. For this purpose a control valve 36 in the inert gas line 13 is controlled accordingly by the controller 35. The gas mixture 15 produced in this way is supplied via a double pipe 21, 22 of the contact device 2 in an explosion-proof manner. Here the gas mixture 15 is conveyed in the inner pipe 21, which is surrounded by a casing 22. This casing is filled with inert gas and kept under excess pressure, so that in the event of any leakage no explosive gas mixture can be produced. The inert gas filling in the casing is ensured by a control valve 37 and a differential pressure control device 38 connected thereto, with which any leakage can immediately be detected. At point 18 the mixing gas 15 is mixed directly with the recycling gas. For this purpose is used an admixing component 19, e.g. in the form of a perforated pipe or a static mixing component. The plant shown in FIG. 2a also comprises a preheating device 24 for the gas circulation in front of the catalyst 9, with which the required gas temperature in the catalyst can be reached in the start-up region. This preheating of the recycling gas in front of the catalyst is further assisted by a heat exchanger 25, through which the heated recycling gases pass behind the catalyst. A jet pump 26 as a conveying medium is used to circulate the recycling gas mixture. The water inlet 3 also comprises a heat exchanger 28, in which, for example, waste heat from the cooling water can be used by other units. The efficiency of the process according to the invention can be further increased by heating the sea water supplied, e.g. from 8° to 20°.

Figure 2A:
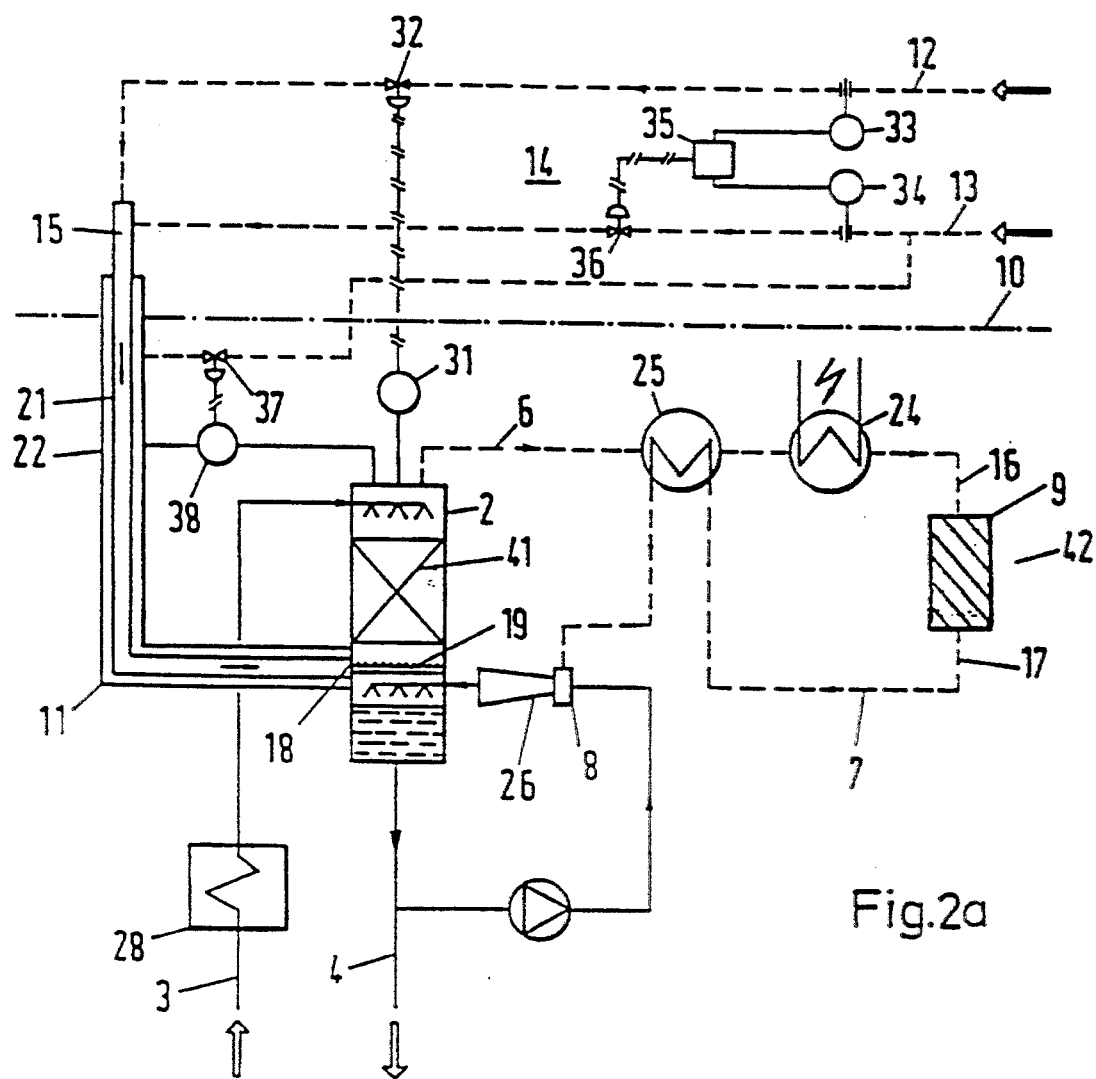
FIG. 2a shows an example of a plant with a double-pipe supply for a fuel gas/inert gas mixture and a mixing and metering device.
Figure 2B:
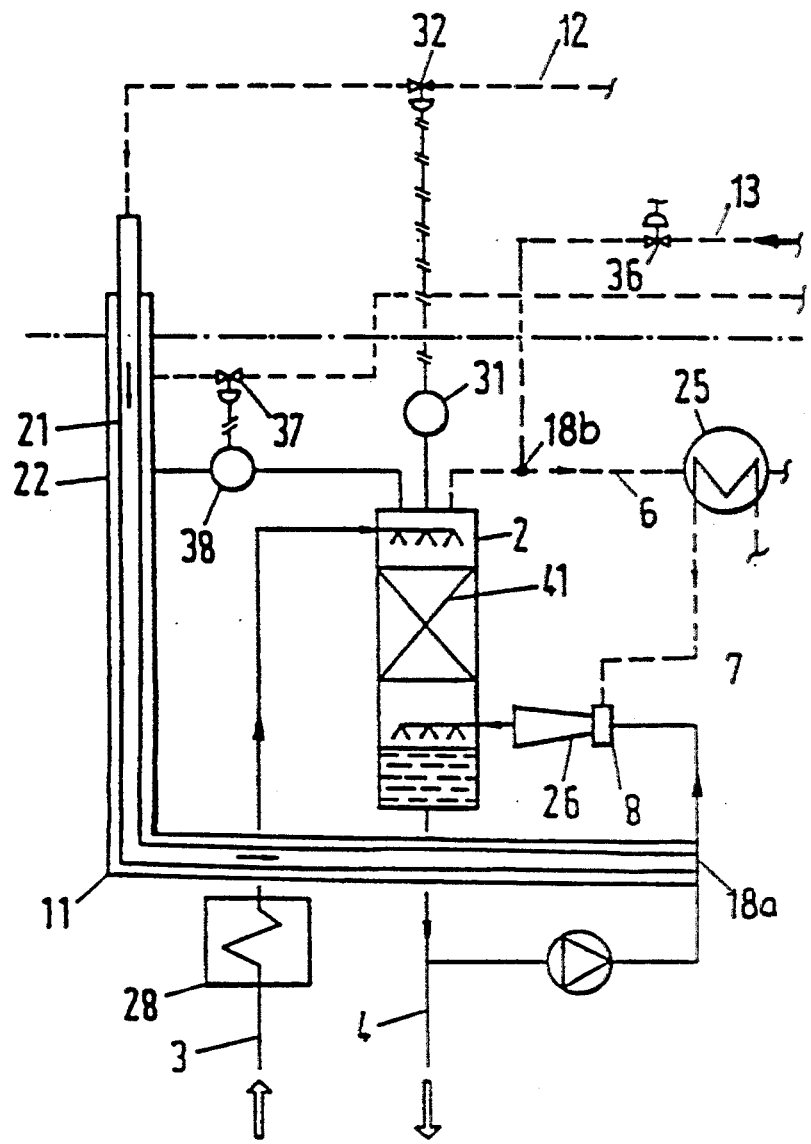
FIG. 2b shows a plant with separate supply lines for a fuel gas and an inert gas.

FIG. 2b shows a second plant 1 according to the invention, which differs from the plant in FIG. 2a in that the fuel gas and the inert gas are not introduced into the circulation 6, 7 as a mixture but separately. At the feed point 18a the fuel gas is mixed with the water, which forms the propulsion jet of the jet pump 26. The inert gas is supplied to the feed point 18b of the gas mixture of the circulation 6, 7. The parts omitted in FIG. 2b correspond to the parts represented on the right of FIG. 2a. The two gas streams 12 and 13 are also supplied in phase with one another to the plant 1 by means of a metering device 14 as in FIG. 2a.

The further description of the invention is restricted to the process with the introduction of a gas mixture as shown in FIG. 1 and 2a. However these details can be transferred according to the process with the separate supply of fuel gas and inert gas.

Figure 3:
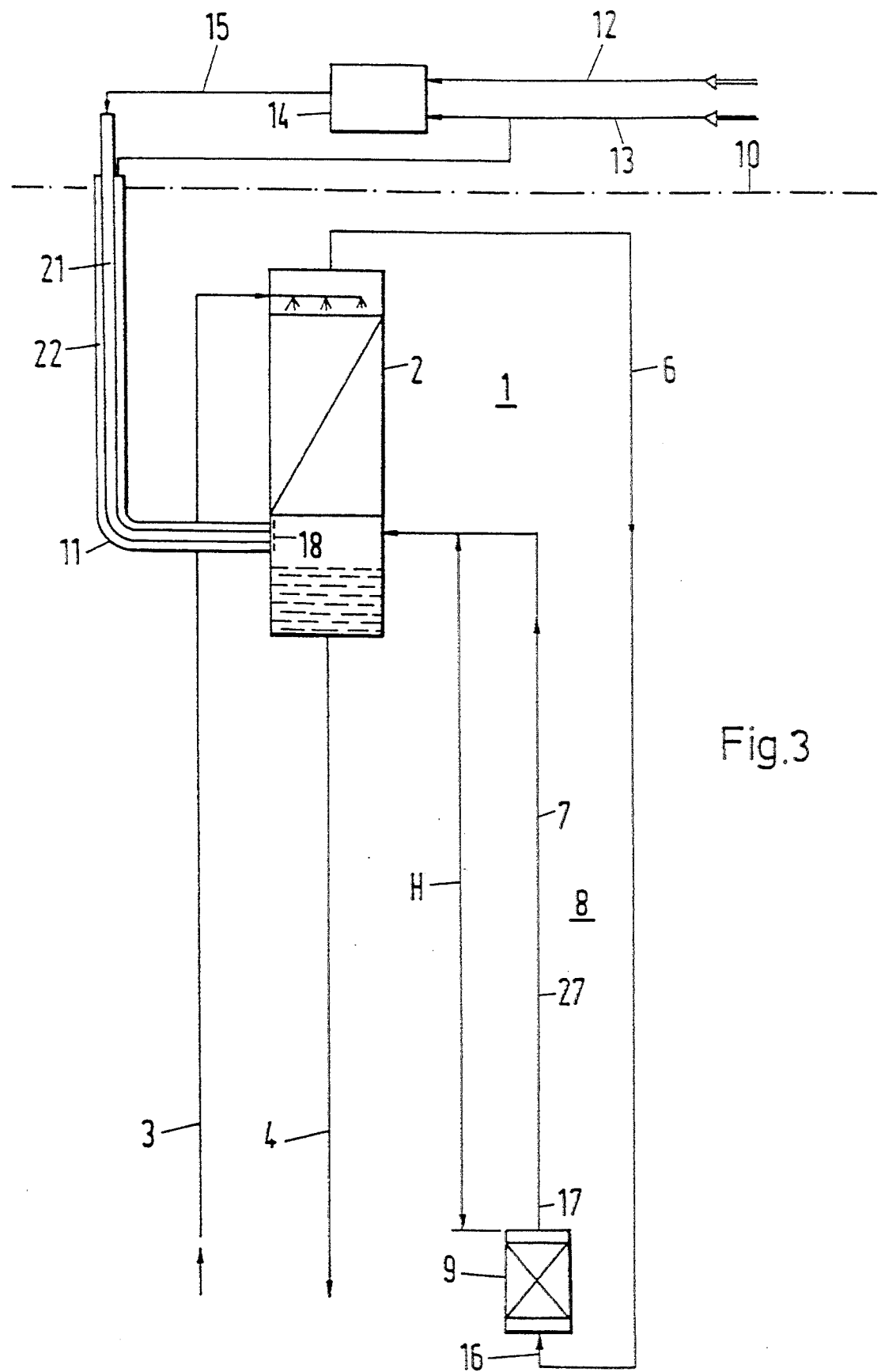
FIG. 3 shows a plant with convection flow as the conveying medium for the gas circulation.

FIG. 3 shows a particularly simple plant, in which a convection flow is used as the conveying medium 8 for the circulation. For this purpose the catalyst 9 is used in an ascending line 27 to the contact device 2 so that the catalyst device 9 is at least 20 m lower than the contact device 2. Here it is particularly important to use only components having the lowest possible pressure drop in the entire circulation. Sealing devices are particularly suitable for this. Thus according to FIG. 2a controlled sealing devices 41 are used in a counter-flow strip column 2 and a controlled sealing device 42 is used in the catalyst 9.

Figure 4:
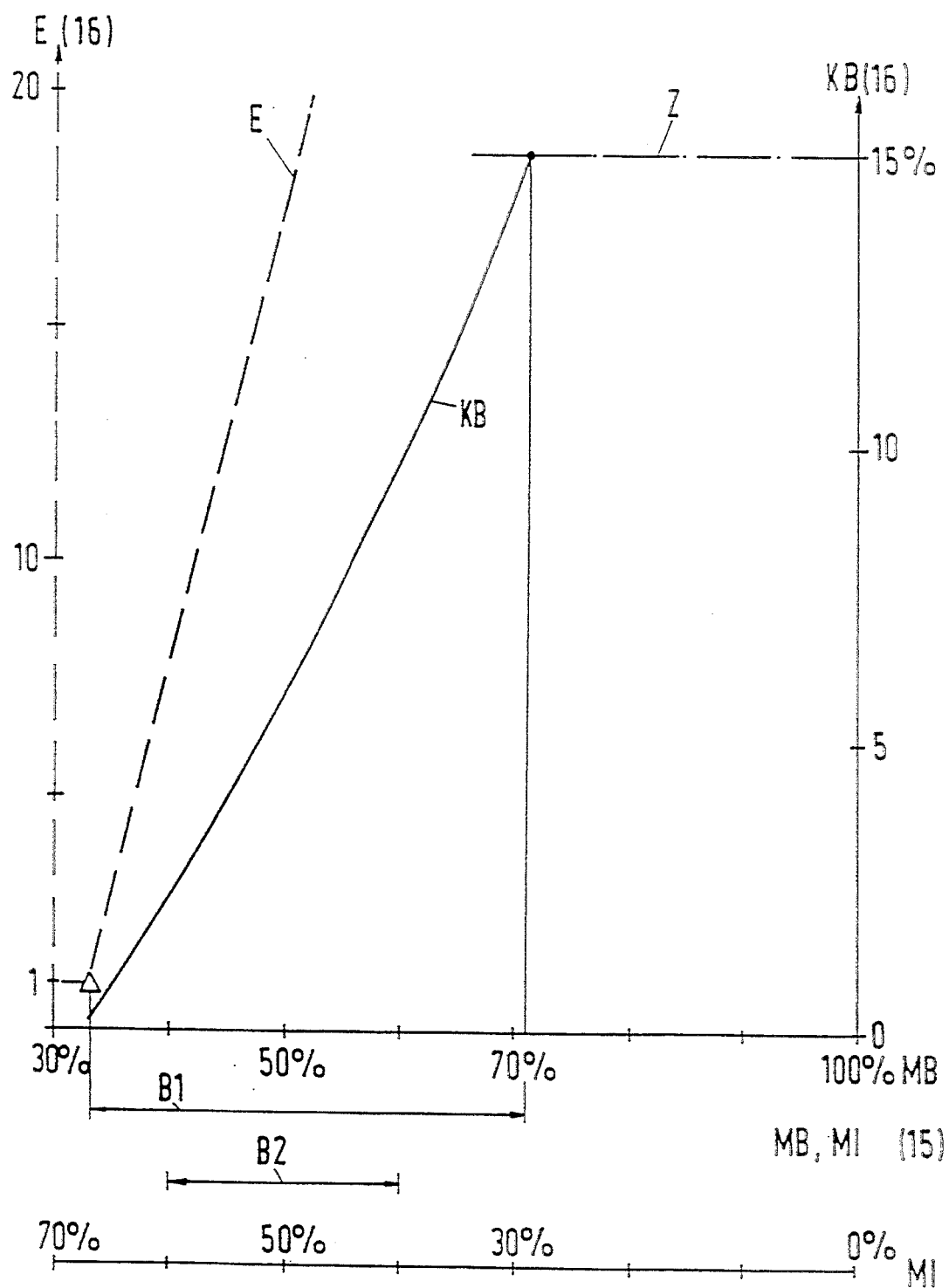
FIG. 4 shows the path of the excess factor E and of the gas composition of the recycling gas as a function of the composition of the gas mixture supplied, with the example of natural gas/nitrogen.

In FIG. 4 is represented the effect of the gas mixture supplied 15, having a fuel gas content MB and an inert gas content MI, on the resultant composition of the recycling gas 16 and in particular on its fuel gas content KB in front of the catalyst 9. In this example natural gas is used as fuel gas and nitrogen is used as inert gas with a circulation pressure of 1.25 bar. FIG. 4 shows that the resultant fuel gas content KB in the circulation at point 16 depends as follows on the gas mixture 15 supplied:

An operative gas mixture for the removal of oxygen is produced with an excess factor E of at least 1, which is achieved with a fuel gas content MB of just roughly 33% natural gas (and accordingly roughly 67% nitrogen).

The upper limit is determined by the fact that the recycling gas mixture reaches the ignition limit Z, which is achieved with a fuel gas content KB of roughly 15% for natural gas. This corresponds to a fuel gas content MB of roughly 71% natural gas (and accordingly 29% $N_2$) in the added gas.

These lower and upper limits define a permissible range B1 for the fuel gas content of ca. MB=71%−33%=38%. Here, for example, MB values of 40% and 60% natural gas in the added gas can be selected as the practical range of control B2. It is possible to maintain this very well and safely and with a simple, cheap mixing and metering device 14. With higher circulation pressures the limits and thus ranges B1, B2 move to lower MB values, i.e. to lower fuel gas contents in the added gas 15. In contrast an increase in the water temperature produces higher MB values for the ranges B1 and B2.

I claim:

1. A process for the deoxidation of water comprising the steps of:

directing a gaseous propellant along a conduit so that the gaseous propellant comes in contact with the water to remove oxygen from the water by liquid-gas mass transfer and to form an oxygen enriched gaseous propellant;

after the directing step, introducing a gas mixture of fuel gas and inert gas into and oxygen enriched gaseous propellant to form a fuel gas and oxygen enriched gaseous propellant and directing the fuel gas and oxygen enriched gaseous propellant into a catalytic combustion device to remove the oxygen from the fuel gas and oxygen enriched gaseous propellant; and selecting the flow rates of the fuel gas and the inert gas such that the fuel gas has a concentration that is greater than the amount necessary for the stoichiometric removal of oxygen in the catalytic combustion device and the inert gas has a concentration sufficient to prevent the fuel gas concentration from exceeding the ignition limit.

2. A process for the deoxidation of water comprising the steps of:

introducing a fuel gas along a first line into a conduit to form a fuel gas enriched gaseous propellant;

directing the fuel gas enriched gaseous propellant along the conduit so that the fuel gas enriched gaseous propellant comes in contact with the water to remove oxygen from the water by liquid-gas mass transfer and to form a fuel gas and oxygen enriched gaseous propellant;

directing the fuel gas and oxygen enriched gaseous propellant into a catalytic combustion device to remove the oxygen from the fuel gas and oxygen enriched gaseous propellant;

introducing an inert gas along a second line into the conduit; and selecting the flow rates of the fuel gas and the inert gas such that the fuel gas has a concentration that is greater than the amount necessary for the stoichiometric removal of oxygen in the catalytic combustion device and the inert gas has a concentration sufficient to prevent the fuel gas concentration from exceeding the ignition limit.

3. The process of claim 1 wherein the fuel gas is a natural gas, the flow rates of the natural gas and the inert gas being selected to obtain a concentration of natural gas less than 15 mol % in the fuel gas and oxygen enriched gaseous propellant flowing through the conduit.

4. The process of claim 1 wherein the fuel gas is hydrogen, the flow rates of the hydrogen and the inert gas being selected to obtain a concentration of hydrogen less than 4 mol % in the fuel gas and oxygen enriched gaseous propellant flowing through the conduit.

5. The process of claim 1 wherein the inert gas is nitrogen.

6. The process of claim 1 wherein the flow rates of the fuel gas and the inert gas are selected to maintain a constant pressure in the conduit.

7. A process for the deoxidation of water comprising the steps of:
   directing a gaseous propellant along a conduit so that the gaseous propellant comes in contact with the water to remove oxygen from the water by liquid-gas mass transfer and to form an oxygen enriched gaseous propellant;
   after the directing step, introducing a gas mixture of fuel gas and nitrogen gas into said conduit to form a fuel gas and oxygen enriched gaseous propellant and directing the fuel gas and oxygen enriched gaseous propellant into a catalytic combustion device along the conduit to remove the oxygen from the fuel gas and oxygen enriched gaseous propellant;
   selecting the flow rates of the fuel gas and the nitrogen gas to maintain a constant pressure in the conduit; and
   selecting the flow rates of the fuel gas and the nitrogen gas such that the fuel gas has a concentration that is greater than the amount necessary for the stoichiometric removal of oxygen in the catalytic combustion device and the nitrogen gas has a concentration sufficient to prevent the fuel gas concentration from exceeding the ignition limit.

8. The process of claim 7 wherein the fuel gas is a natural gas, the flow rates of the natural gas and the nitrogen gas being selected to obtain a concentration of natural gas less than 15 mol % in the fuel gas and oxygen enriched gaseous propellant flowing through the conduit.

9. The process of claim 7 wherein the fuel gas is hydrogen, the flow rates of the hydrogen and the nitrogen gas being selected to obtain a concentration of hydrogen less than 4 mol % in the fuel gas and oxygen enriched gaseous propellant flowing through the conduit.

10. A process for the deoxidation of water comprising the steps of:
    circulating a gaseous propellant along a fluid path so that the gaseous propellant comes in contact with the water to remove oxygen from the water by liquid-gas mass transfer;
    introducing a fuel gas into said fluid path to form a fuel gas enriched gaseous propellant;
    introducing an inert gas into the fluid path;
    directing the fuel gas enriched gaseous propellant into a catalytic combustion device to remove oxygen removed from the water and present in the fuel gas enriched gaseous propellant; and
    selecting the flow rates of the fuel gas and the inert gas such that the fuel gas has a concentration that is greater than the amount necessary for the stoichiometric removal of oxygen in the catalytic combustion device and the inert gas has a concentration sufficient to prevent the fuel gas concentration from exceeding the ignition limit.

* * * * *